Dec. 15, 1942.  G. NEMETZ  2,305,455
PRESSURE LUBRICATING SYSTEM
Filed Dec. 11, 1940
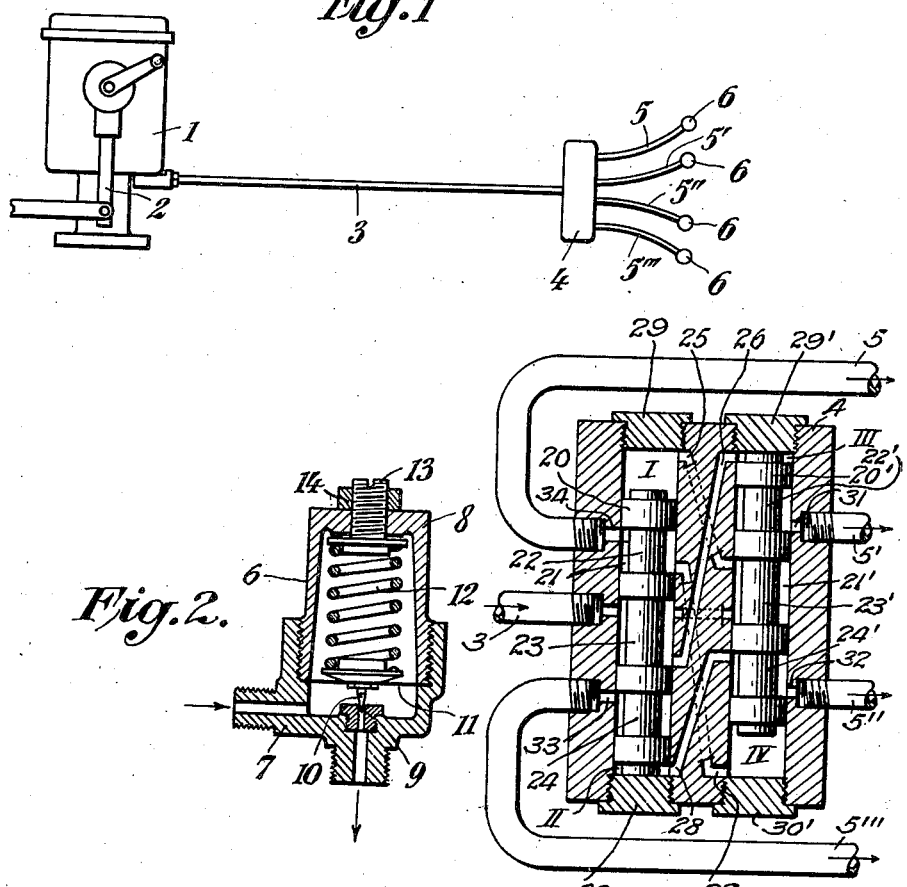
INVENTOR:
GUSTAV NEMETZ
BY Karl B. Mayr
ATTORNEY.

Patented Dec. 15, 1942

2,305,455

UNITED STATES PATENT OFFICE 2,305,455

PRESSURE LUBRICATING SYSTEM

Gustav Nemetz, Vienna, Germany; vested in the Alien Property Custodian

Application December 11, 1940, Serial No. 369,598
In Germany December 9, 1939

2 Claims. (Cl. 184—7)

This invention relates to pressure lubricating systems in which the lubricant supplied by a source of pressure is conveyed into a distributing device of the kind such as disclosed in U. S. Patent No. 2,027,171, or 2,007,797. In these known distributing devices, the pressure of the lubricant acts upon pistons movable within cylinder bores and controlling a system of channels so as to distribute the lubricant to several points of lubrication connected to the distributed device.

In particular, the invention relates to a system for lubricating arrangements in which different counter-pressures prevail at the points of lubrication and wherein said pressures may, moreover, be variable. This condition, with conventional systems, seriously interferes with the accuracy of distribution of the lubricant, because said counter-pressures act through the conduits upon the pistons of the distributing device and lubricant passes through the clearance between the pistons and their cylinders from higher pressure conduits into conduits in which a lower pressure prevails. The required quantities of lubricant being accurately dosed for the sake of economy, any diminution thereof is apt to cause sericus damage to the machine to be lubricated.

The present invention has for its object to overcome the difficulty set forth above by preventing any detrimental reaction of different pressures at the individual points of lubrication, thus assuring a regular and perfectly accurate distribution of the lubricant.

A lubricating arrangement embodying the invention is represented by way of example in the accompanying drawing.

Fig. 1 is a diagrammatic view of an arrangement according to the present invention.

Fig. 2 is a sectional view of a device provided according to the invention at each point of lubrication.

Fig. 3 is a longitudinal sectional view of a lubricant distributing device which may be used in connection with the system according to the present invention.

Referring more particularly to the drawing, the lubricant is pressed forward by a pump 1 operated in a known manner by a suitable source of power by means of an oscillating lever 2. A conduit 3 connects pump 1 to a distributing device 4 which, as shown in Fig. 3, may consist of a casing 4 comprising cylinder bores 21 and 21' in which operate pistons 20 and 20'. Piston 20 is provided with recesses 22, 23 and 24 and pistol 21' with recesses 22', 23' and 24'. The pistons are actuated by the pressure of the lubricant produced in pump 1 and control channels 25, 26, 27 and 28 which interconnect bores 21 and 21' in the manner shown. Operating chambers I, II, III and IV formed by the ends of the pistons and the oppositely situated plugs 29, 30 and 29' and 30' are periodically, alternately connected with the lubricant supply conduit 3 and with the lubricant discharge conduits 31, 32, 33 and 34 individually and respectively coordinated with said chambers. The pistons are reciprocated by the pressure of the lubricant produced in pump 1 to the extent permitted by plugs 29, 29', 30 and 30'.

Chambers I, II, III and IV receive a limited amount of lubricant from conduit 3 and the pistons 20 and 20' periodically push the lubricant in limited portions through outlets 31, 32, 33 and 34 to the points to be lubricated, which, thereby, receive measured amounts of lubricant. Conduits 5, 5', 5", and 5''' individually lead from the four outlets to a point to be lubricated. A device 6 shown in Fig. 2 is arranged in each conduit 5, 5', 5" and 5'''.

The device 6 is built as a terminal valve known per se. The pressure prevailing at the point to be lubricated is without influence on the opening of said valves. The lubricant supplied by one of the conduits 5, 5', 5", 5''' enters the casing of the valve consisting of parts 7 and 8 and passes therefrom towards the point of lubrication as shown by the arrows. At the inner end of the discharge channel is provided a seat 9 for a valve cone 10 fixedly connected to a diaphragm 11 the outer edge of which is clamped in the joint between the parts 7 and 8 of the casing. A helical spring 12 abuts at one end the rear end of valve cone 10 and at the other end a bolt 13 screwed into the cap part 8 of the casing. A nut 14 secures the bolt 13 in desired position.

When at rest, the valve member 10 is pressed to its seat by the power of spring 12. The compression of the spring can be varied by screwing bolt 13 in or out. The lubricant supplied by the distributing device enters into the space underneath the diaphragm. As soon as the pressure of the lubricant exceeds the pressure of the spring, valve member 10 is lifted off its seat, whereupon the lubricant is free to flow to the respective point of lubrication.

If in all the devices 6 of the lubricating system according to the invention the springs are set for the same opening pressure and if such pressure is selected higher than the maximum pressure that may possibly prevail at any of the points of lubrication, any harmful reaction of the unequal pressures at the points of lubrication upon the pistons of the distributing device and any consequent interference with the proper distribution of the lubricant will be positively prevented. The lubricating arrangement according to the invention is independent of the unequal and varying pressures prevailing at the points of lubrication because the terminal valves 6 maintain the same pressure in all conduits 5 and consequently in all chambers I to IV.

I am aware that it is known practice to arrange back-pressure valves at the points of lubrication for the purpose of protecting the distributor and the source of pressure from detrimental actions of the steam or compressed air which may be present at the points of lubrication. The opening pressure of such back-pressure valves is, however, dependent upon the counter-pressures prevailing at the points of lubrication and, therefore, they are unable to answer the purpose of the present invention which is to obviate any interference with the operation of the distributing device and any inaccurate distribution of the lubricant resulting therefrom.

What I claim is:

1. A pressure lubricating system for lubricating a plurality of points at which different pressures prevail, said system comprising a source of lubricant under pressure, a lubricant measuring and distributing device, a lubricant conduit connecting said source and said device, said device comprising a plurality of cylinder bores and pistons reciprocated therein by the pressure of the lubricant, lubricant outlet means connected with said bores, said pistons distributing and measuring the lubricant to said outlet means in accordance with the strokes and diameters of said pistons, other conduits individually interconnecting said outlet means and the points to be lubricated, and a plurality of terminal valves individually inserted in said other conduits, each of said valves comprising a valve seat and a loaded valve member forced against said seat in the direction of the lubricant flow, the load on all of said valve members being uniform and at least as high as the highest pressure prevailing at the points to be lubricated.

2. A pressure lubricating system as set forth in claim 1, wherein said terminal valves are arranged adjacent to the points to be lubricated.

GUSTAV NEMETZ.